United States Patent
Olsson et al.

(10) Patent No.: US 8,145,721 B2
(45) Date of Patent: Mar. 27, 2012

(54) BIT STREAMS COMBINATION OF DOWNLOADED MULTIMEDIA FILES

(75) Inventors: Andreas Olsson, Stockholm (SE); Mårten Sundberg, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 12/529,468

(22) PCT Filed: Mar. 1, 2007

(86) PCT No.: PCT/SE2007/000200
§ 371 (c)(1),
(2), (4) Date: Mar. 3, 2010

(87) PCT Pub. No.: WO2008/105695
PCT Pub. Date: Sep. 4, 2008

(65) Prior Publication Data
US 2010/0180044 A1   Jul. 15, 2010

(51) Int. Cl.
*G06F 15/16* (2006.01)
(52) U.S. Cl. ........................................... 709/206
(58) Field of Classification Search .................. 709/206, 709/207; 707/104
See application file for complete search history.

(56) References Cited

U.S. PATENT DOCUMENTS 7,236,988 B2 * 6/2007 Li et al. ............................ 1/1
2006/0135200 A1   6/2006 Yun et al.

FOREIGN PATENT DOCUMENTS

WO   WO 03042783 A2   5/2003

* cited by examiner

*Primary Examiner* — Adnan Mirza (57) ABSTRACT

A method for downloading a multimedia file from a server (101, 201, 300, 701) to a user device (100, 200, 400, 700), at least partly via a bandwidth limited connection (202, 702), a server and a user device adapted therefore. A user device, connected to a server selects a multimedia file to be downloaded via two bit streams. In the server the selected multimedia file is divided and coded into a first, low-quality part, and into a second, high-quality part (503). When certain conditions (505) set up for the first part are fulfilled, this part is streamed via a first bit stream (506), and when certain conditions set up for the second part are fulfilled, the second part is downloaded via a second bit stream (508). In the user device, the first part is received and reproduced (603*b*) as a limited version, available to be played-up in real time (604), while the second part is reproduced and combined with the first part (610, in order to yield the original multimedia file.

20 Claims, 5 Drawing Sheets

(PRIOR ART)

BIT STREAMS COMBINATION OF DOWNLOADED MULTIMEDIA FILES

TECHNICAL FIELD

The present invention relates generally to a method and arrangement for downloading of multimedia files, and especially for making a more efficient use of available resources when downloading a multimedia file, such as e.g. a music file.

BACKGROUND

Today, consumers have several alternatives to choose from when purchasing multimedia content, such as e.g. films, games or music. Apart from a traditional, physical purchase of a film, a software game or a record, the increased use of the Internet and mobile telephones, together with the development of services specially adapted for downloading and purchasing of different types of multimedia content have made it easier to put these types of products into market via public fixed and wireless networks.

One powerful feature available today is to provide customers with the possibility to stream music in real time, i.e. listening to a tune while downloading it to a user device. When streaming music, the required throughput must be the same as the coding of the file in order to achieve an acceptable quality when listening to the music. These requirements impose a trade-off between the streaming capacity of the system and the achievable quality after a downloading.

Figure 1:
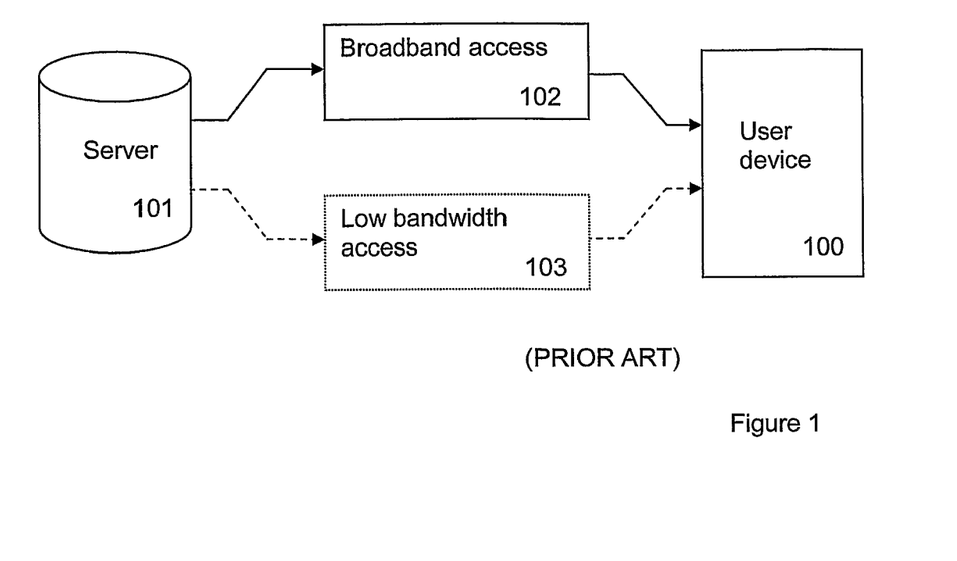
FIG. 1 is a basic overview of alternative ways of downloading a multimedia file, according to the prior art.

There are a number of wireless and fixed access techniques suitable for downloading of multimedia files available today. FIG. 1 illustrates a user device 100, connected to a server 101, adapted to download multimedia files over a broadband access 102. One broadband alternative for downloading a multimedia file is to use a streaming service via a Wideband Code Division Multiple Access (WCDMA) network. Another alternative is to use a fixed broadband access such as e.g. the Internet. However, if a broadband access network is not available, an alternative, low bandwidth access network 103, e.g. a GSM connection, will be required.

One wireless alternative available today is Enhanced Data Rates for GSM Evolution (EDGE), which is a technique, suitable for providing wireless downloading of larger multimedia files via GSM. One problem with using GSM/EDGE for downloading of multimedia files is, however, that the quality of the streaming service may not be as good as if downloaded from an available broadband access network, such as e.g. the Internet.

In order to achieve a throughput, providing sufficiently high-quality it is required that several time slots are used for the downloading of a multimedia file. Using several time slots and priority in scheduling, however, decreases the capacity of a cell, which in turn decreases the number of simultaneous downloads which can be provided to that cell. When using one time slot, the maximum throughput provided with GSM/EDGE today is 59.2 kbps. For an MP3-file to have a quality comparable to CD-quality, however, a throughput of at least 128 kbps will be required. Thus, for this ideal scenario, assuming the user to reach peak throughput, three time slots (cell(128/59.2)=3) will be required for downloading a music file with adequate quality. This is considered as a quite high amount of the normally offered bandwidth in a cell using GSM/EDGE. The fact that a music file can be downloaded to a home computer and transferred to an MP3-player or a mobile telephone at a relatively low cost, providing a comparable or better quality makes the described multi-slot streaming alternative over GSM/EDGE less attractive and less worth its price compared to other alternatives, available at the market today.

It would therefore be advantageous to find a way to make better use of the available resources used for downloading multimedia files, when downloading, at least partly, over a bandwidth limited connection.

It is also desirable to provide a user the option to play a multimedia file in real-time during download, while using available resources more efficiently during the downloading.

It is also desirable to provide a user the option to play a multimedia file in real-time in a lower quality coding before purchase decision.

SUMMARY

The object of the present invention is to address at least some of the problems outlined above. In particular, it is an object to provide a solution which enables a more efficient use of the resources used for downloading a multimedia file, e.g. a music tune, over a bandwidth limited connection. It is also an object to allow a user to listen to one version of a selected multimedia file in real-time, while downloading.

According to one embodiment, a method of downloading a multimedia file from a server to a user device, at least partly using a bandwidth limited connection, is provided. A server, receiving a request to connect a user device to a downloading service connects the user device. When a request for downloading of a multimedia file via two bit streams is received from the user device, the multimedia file is adapted for downloading via two bit streams. The adaptation comprises dividing of the multimedia file into a first part, which is coded using a first coding, and into a second part, which is coded using a second coding. Both parts are then stored in a storage means in the server. A first set of conditions for streaming the first part via a first bit stream, and a second set of conditions for downloading the second part via a second bit stream are set up. When the first set of conditions is fulfilled the first part is streamed to the user device, and when the second set of conditions is fulfilled the second part is downloaded to the user device.

The first part may be coded on the basis of the throughput requirements for streaming the first bit stream, and the throughput requirements for the streaming may also be the same as the coding of the first part of the selected multimedia file.

The first access technology may be any access technology, providing a low bandwidth, such as e.g. GSM/EDGE, while the second access technology may be any broadband access technology, such as e.g. WLAN, WCDMA, LTE, WiMAX, CDMA, DSL or ADSL.

According to one embodiment, the first and second sets of conditions are set so that the first and the second parts are downloaded via the same access technology.

According to another embodiment, the first set of conditions is set so that the first part is streamed via a first access technology, and the second set of conditions is set so that the second part is downloaded via a second access technology, different from the first access technology.

A method of reproducing the content of a multimedia file, downloaded from a server to a user device is also provided, wherein the downloading is executed at least partly via a bandwidth limited connection. Initially, the user device is connecting to a downloading service, provided by a server.

A request for downloading a multimedia file via two separate bit streams is sent from the user device to the server when a multimedia file has been selected through user interaction by a user of the user device. A first bit stream, received by the user device comprises a first, low-quality part of the selected multimedia file. In the user device, the first part is used for reproducing a limited version of the multimedia file, which is adapted to be played-up in real-time by a multimedia player of the user device. The user device is also receiving a second bit stream, comprising a second, high-quality part of the multimedia file. The limited version and the second part are stored in a storing means of the user device.

Upon receiving the first part, the limited version is reproduced by decoding the first part and the content of the first part is played-up in real-time. A complete version of the selected multimedia file is reproduced by decoding the second part and by combining the first, decoded part with said second, decoded part. Both versions are then stored in a storing means of the user device.

Once stored, any version may be played-up by a multimedia player upon receiving such a request through a user interaction.

A user device is adapted to reproduce the content of a multimedia file, downloaded from a server, at least partly using a bandwidth limited connection. The user device comprises a multimedia client, adapted to request for a connection set-up with a server, when a request for a downloading service has been activated through user interaction via a user interface of the user device. The user device also comprises a transmitting means for transmitting a first request for the requested downloading service to the server, and for transmitting a second request for downloading a selected multimedia file.

A receiving means is adapted to receive a first bit stream and a second bit stream, carrying the content of the selected multimedia file, in response to the second request A reproducing means, controlled by the multimedia client, is reproducing a limited version of the multimedia file, from the first part. It also reproduces a complete version of the multimedia file by combining the first part with the second part.

A storing means of the user device is used for storing a first, limited version of the multimedia file, received in the first bit stream, a second part, received in the second bit stream, and a complete version, retrieved from the combining.

The user device also comprises a multimedia player for playing-up a version of the selected multimedia file when such a version is indicated by the multimedia client.

The multimedia client can be adapted to instruct the reproducing means to reproduce the first part, and to forward the reproduced part to the multimedia player for playing-up the limited version in real-time.

The multimedia client may also be adapted to instruct the reproducing means to reproduce the limited version when the receiving means receives said first bit stream, and to reproduce said complete version when the receiving means has received the second bit stream.

The multimedia client may be adapted to indicate a successful receipt of each of the respective part of said downloaded multimedia file by initiating a transmission to said server of a COMPLETE message for each part.

The invention further refers to a server capable of downloading a multimedia file to a user device, at least partly via a bandwidth limited connection. The server comprises a controlling means, adapted to set-up a downloading service connection with a user device upon receiving a first request, and to initiate a downloading via two bit streams upon receiving a second request from the user device to download a multimedia file. The server further comprises a receiving means for receiving the first request, and the second request, and a dividing means for dividing the multimedia file into a first part and a second part. The dividing means is adapted to code the first part, using a first coding, and the second part, using a second coding. The server also comprises a storing means for storing the first part and the second part. A transmitting means is used for streaming a first bit stream, comprising the content of the first part, when a first set of conditions, set by the controlling means is fulfilled, and for downloading a second bit stream, comprising the content of the second part when a second set of conditions, set by the controlling means is fulfilled.

The dividing means of the server may be adapted to code the first part on the basis of throughput requirements for streaming the first part of said selected media file. The dividing means may also be adapted to code the first part and the second part on the basis of different requirements.

The dividing means may further adapted to divide and code the selected multimedia file into a first low-quality part, comprising content necessary for reproducing a limited version of the selected multimedia file, and into a second high-quality part, comprising content, necessary for reproducing the original, multimedia file by combining the content of the first part and the second part.

The controlling means may be adapted to set-up the condition sets so that both parts to be transmitted are transmitted via the same access technology. Alternatively, the controlling means can be adapted to set-up the condition sets so that both parts are transmitted via different access technologies.

The controlling means may be adapted to receive a COMPLETE message, by the receiving means, wherein the COMPLETE message verifies a successful reception of a part of the selected multimedia file from the requesting user device when the respective part has been successfully received by the user device.

The controlling means may be adapted to terminate the downloading upon receiving a COMPLETE message indicating that the second part has been successfully received by the user device.

BRIEF DESCRIPTION OF THE DRAWINGS

The present invention will now be described in more detail by means of exemplary embodiments and with reference to the accompanying drawings, in which.

DETAILED DESCRIPTION

Briefly described, the present invention provides a solution where the resources available on a bandwidth limited connection can be used more efficiently for downloading of a multimedia file. This is achieved by way of splitting-up the multimedia file into two parts which are transmitted over separate bit streams in an efficient way.

A first, low-quality part, which is transmitted over a bandwidth limited access technology is streamed to the requesting user device, while a second, high-quality part may be sent on a more optimal occasion and/or via an alternative access technology, providing better downloading conditions such as e.g. a better radio environment, transmission quality or bandwidth.

Figure 2:
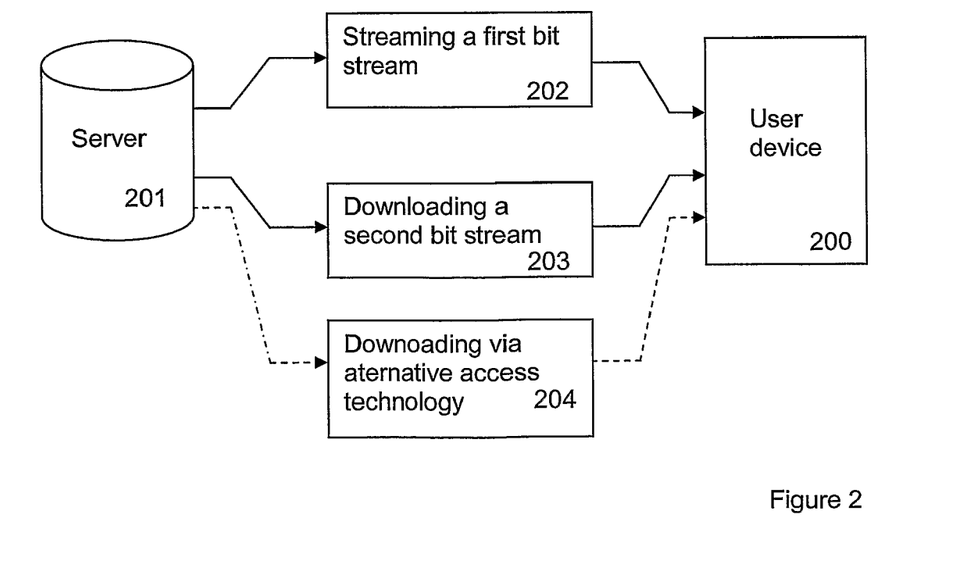
FIG. 2 is a basic overview of a way of downloading a multimedia file via two different bit streams, each carrying a part of the multimedia file, according to one embodiment.

FIG. 2 schematically illustrates one way of downloading a multimedia file using bit stream combination according to one embodiment of the claimed invention, i.e. via two different bit streams, each carrying a part of a selected multimedia file.

In the figure, a user device 200 is connected to a server 201, adapted to download multimedia files, using a bandwidth limited connection, at least for transmission of a first version of a selected multimedia file. The proposed invention allows a user of the user device to get access to a limited version of a selected multimedia file in real-time, via a first part of the selected multimedia file. The first part is streamed via a first bit stream 202, while a second part, comprising the remaining content of the multimedia file, is transmitted via a second bit stream 203. The different bit streams may be sent on different occasions, with different priorities and/or via different access technologies, such as, e.g. GSM/EDGE, WLAN, WCDMA, LTE, WiMAX, CDMA, DSL or ADSL. If different access technologies are used, the first bit stream is transmitted via a bandwidth limited connection, providing the user of the user device immediate access to a limited version of a selected multimedia file, while an alternative access technology 204 may be used for the transmission of the second bit stream.

Since the user will have immediate access to a limited version, which can be delivered with a relatively good quality, the forwarding of the remaining content of the selected multimedia file, which will be necessary for yielding the original multimedia file in the user device, will be less time critical. The requirements for the alternative access technology may be based on different criteria, such as e.g. downloading cost, available bandwidth or the quality of the radio environment of one or more available access technologies.

Apart from providing a user the possibility to listen to a selected multimedia file in real-time, while downloading the file over a bandwidth limited access technology, a great benefit from using the proposed method is that the air-interface used for transmission between the server and the user device can be used more efficiently, since less radio resources is required for the real-time transmission according to the claimed invention, compared to a conventional transmission. By choosing the connections for the separate bit streams efficiently, both parts, associated with the selected audio file may be transmitted, providing better performance to the one or more networks used.

Consider again the scenario described above, where a 128 kbps coded MP3-file is to be downloaded from a server to a wireless user device via GSM/EDGE. If a user chooses to transmit a multimedia file using the proposed bit stream combination, a music server adapted to provide such a downloading service will be able to deliver three simultaneous streaming sessions, each having e.g. a 44 kbps coding of a limited version of a music tune. A server providing a conventional downloading service, would instead provide just one streaming session over the same connection.

Figure 3:
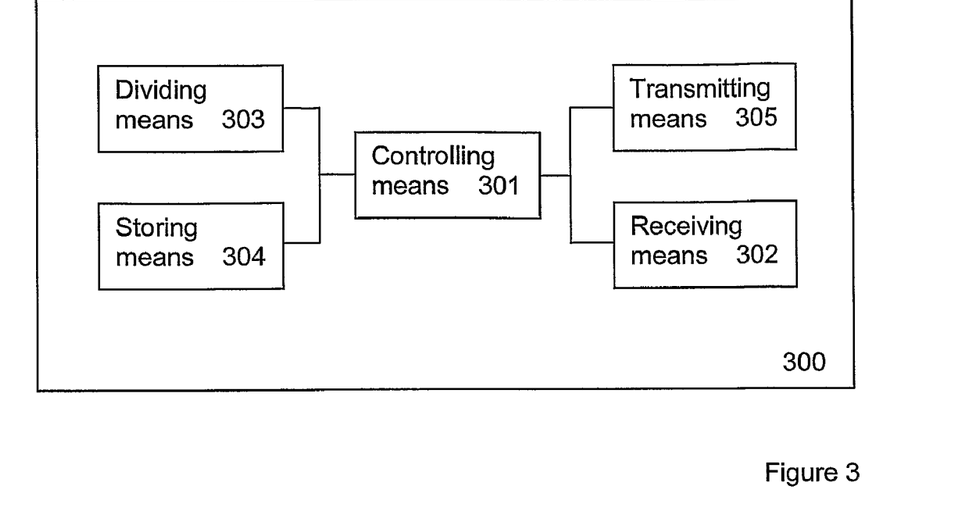
FIG. 3 is a block diagram, schematically illustrating a server adapted to provide a download service of multimedia files via two bit streams according to the described embodiment.

In FIG. 3, a server adapted to download multimedia files via two bit streams according to one embodiment, is schematically described in a block diagram.

A server 300 comprises a controlling means 301, which has the main purpose of controlling each connection set-up between a user device and the server, providing one or more downloading services, upon request from a connected user device. The controlling means also is responsible for the continuing communication between two connected entities, which normally results in the downloading of a multimedia file from the server to the user device. A request from a user device to connect to a downloading service is received by a receiving means 302 of the server. The receiving means is also adapted to receive a request from the user device, requesting for a downloading of a selected multimedia file, as well as other signalling, associated with the connection.

Upon receiving a request for downloading of a multimedia file from a user device, the controlling means is adapted to instruct a dividing means 303 to retrieve the selected multimedia file from a storing means 304. The dividing means is then adapted to divide the multimedia file into two parts, each of which are stored in the storing means until they are to be transmitted to the requesting user device via a transmitting means 305 of the server. When to transmit the respective part is decided by the controlling means on the basis of a set of conditions, one of which is set for each part, associated with the selected multimedia file.

For a user device to be used for the proposed bit stream combination some adaptations will be required. Such a user device, according to one embodiment, will now be described with reference to FIG. 4.

Figure 4:
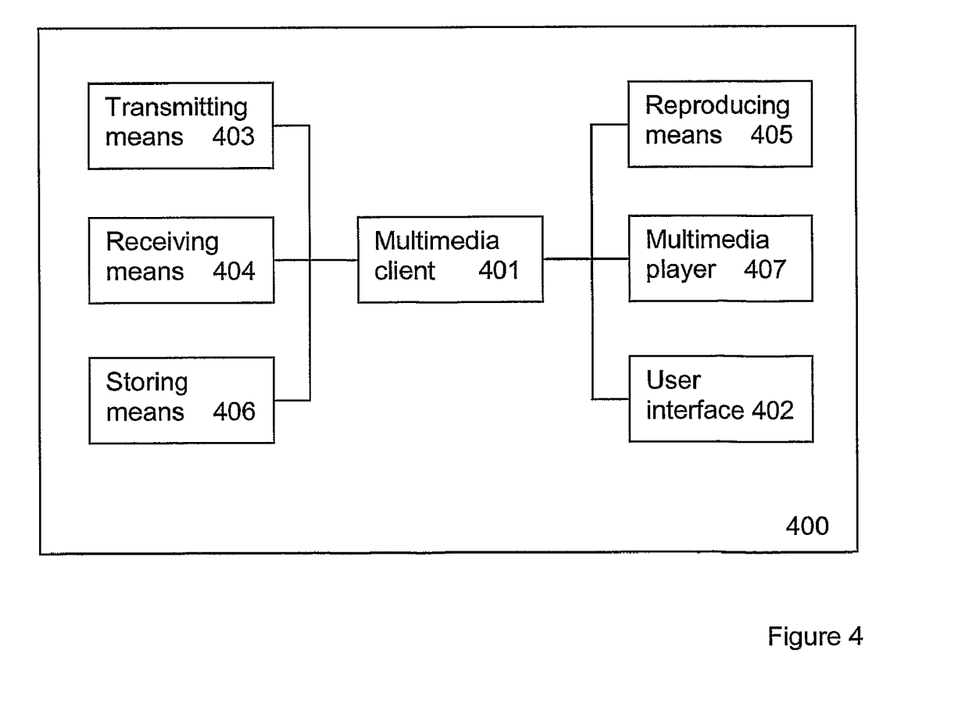
FIG. 4 is a block diagram, schematically illustrating a user device adapted to use the downloading service according to the first embodiment.

The figure describes the general components of a user device 400, which are necessary for downloading multimedia files according to the proposed bit stream combination. The figure comprises a multimedia client 401, responsible for handling requests for setting-up a connection to a server, adapted to provide the described service when such a service has been selected with user interaction via a user interface 402, comprising an input means, such as e.g. a keyboard or a touch screen, and a display, of the user device. The multimedia client is also responsible for handling a downloading procedure specified from a following user interaction, wherein a specific multimedia file has been selected for downloading. A transmitting means 403 is adapted to transmit the requests mentioned above, as well as other signalling, transmitted to the server under supervision of the multimedia client.

Bit streams, carrying content of a selected multimedia file, as well as other signalling messages, transmitted from the server, are received by a receiving means 404. A reproducing means 405 is adapted to reproduce the selected multimedia file, by way of decoding the content of the received bit streams, reproducing a first limited version of a selected multimedia file, and by combining the decoded content of both bit streams into a complete reproduction of the multimedia file. Both reproduced parts are stored in a storing means 406. A multimedia player 407 is adapted to play-up a reproduced version of a multimedia file, in real-time, upon receiving a first bit stream from the server. The multimedia player may also be instructed by the multimedia client to play any version of a downloaded multimedia file, in response to a user interaction of a user.

Figure 5:
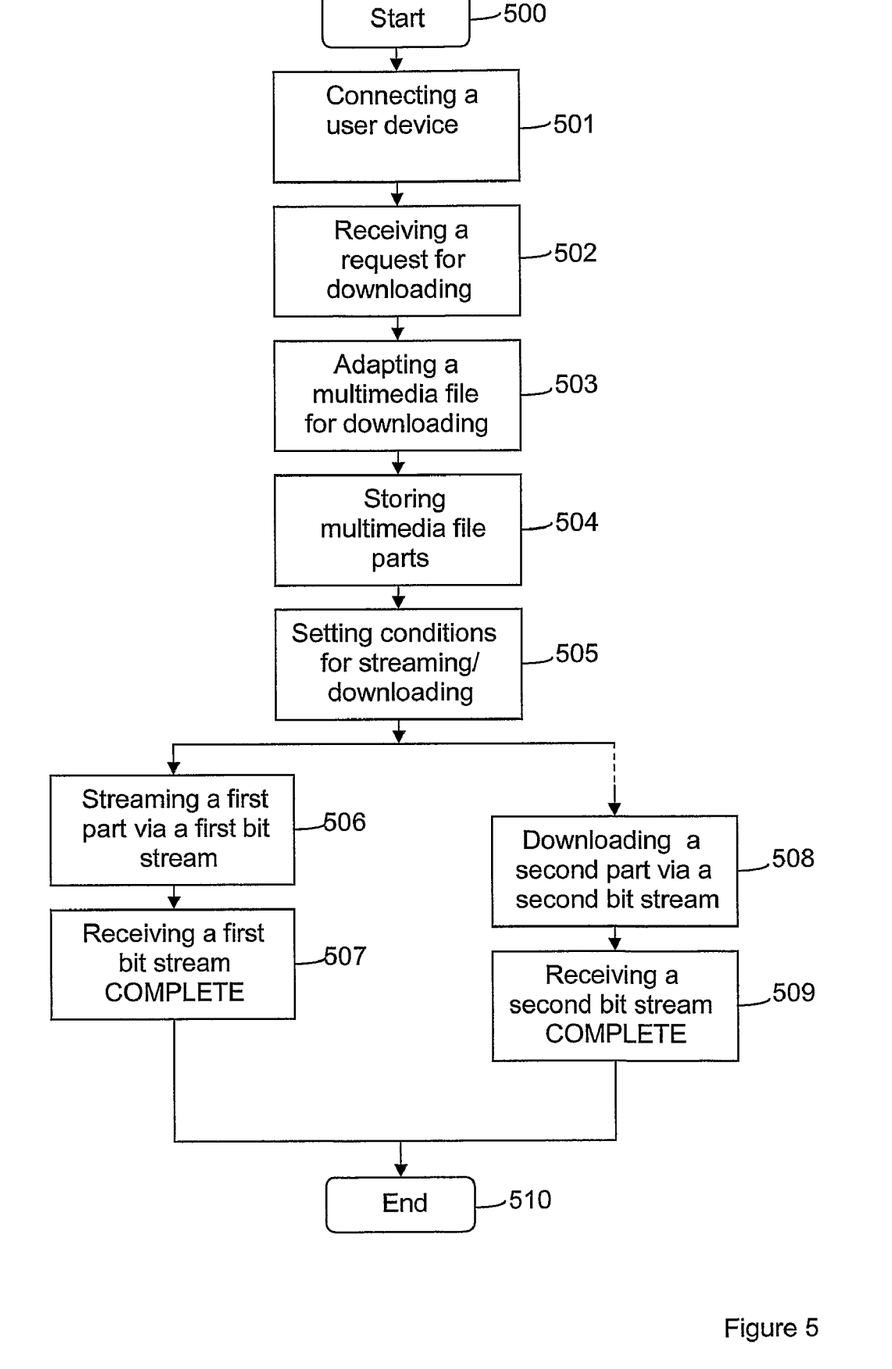
FIG. 5 is a flow chart, illustrating a procedure in the server described with reference to FIG. 3 for downloading a multimedia file according to the first embodiment.

One embodiment for executing a downloading of a multimedia file from a server, adapted to download using bit stream combination will now be described with reference to a flow chart of FIG. 5.

A downloading procedure, using bit stream combination starts with a first starting step 500. In step 501, the server receives a request from a user device to set-up a connection with the suggested downloading service.

In response to this request, a connection is set-up, and a downloading service, comprising the option to download via two bit streams, is provided to the connected user. Included in this step is a two-way signalling, verifying that the user device is adapted to receive multimedia files which are downloaded, using the proposed bit stream combination. This initiating step may also include any type of conventional authentication procedure, wherein it is verified that the user is allowed to access the server and/or the one or more downloading services, provided from the server.

In a next step 502, a request for downloading a multimedia file, using bit stream combination, is received from the user device, which is now connected to the downloading service. The selected multimedia file is divided into two parts in step 503. A first part is coded into a low-quality part and a second part is coded into a high-quality part. The first, low-quality part will contain a limited version of the selected multimedia file, having a lower bit rate coding, e.g. 44 kbps, than the bit rate coding used for the original file, e.g. 128 kbps. The coding of the first part will also allow a user of the user device to stream the content of the first part, i.e. to listen to the multimedia file in real-time during downloading. During the streaming of the first part, the user will experience a quality of e.g. a music tune not reaching CD-quality, but a quality which is good enough for the user to listen to. A second, high-quality part, will comprise the remaining content of the selected multimedia file, necessary for recreating the original multimedia file in the user device when combined with the first part. Until the different parts are transmitted to the requesting user device, both parts are stored in a storing means in step 504.

In a next step 505, the control means of the server sets a set of conditions, comprising one or more conditions for transmitting the content of the respective part to the requesting user device. Since the first part is to be streamed, while the second part will be downloaded, using the same or a different access technology, the set of conditions for the first part will be different than the set of conditions for the second part.

When the set of conditions, set for the first part is fulfilled, the controlling means of the server is instructing the transmitter to retrieve the first part from the storing means and to stream the first part to the user device via a first bit stream. This is done in step 506.

Successful transmission of the first bit stream will be verified from the user device with a message, e.g. a "first bit stream COMPLETE" message. This step is illustrated with step 507 in the flow chart. When the set of conditions for transmitting the second part is fulfilled, the second part is retrieved from the storage means and downloaded to the user device via a second bit stream. This is done in step 508. Also successful reception of the second part is indicated in step 509 with a message, e.g. "second bit stream COMPLETE". If no verification of a successful reception of either of the two parts is received by the server within a predetermined time interval, a re-transmission procedure may be initiated, in order to complete the requested downloading procedure.

When both bit streams have been received successfully by the user device, the downloading procedure is terminated in step 510, but could continue with downloading of additional multimedia files or with a disconnection from server and/or the service.

It is to be noted that a downloading procedure, such as the one described in this document, also comprises a charging procedure, wherein each downloaded multimedia file is charged for according to pre-determined charging conditions. How this is achieved is, however, not in scope of this document.

Figure 6:
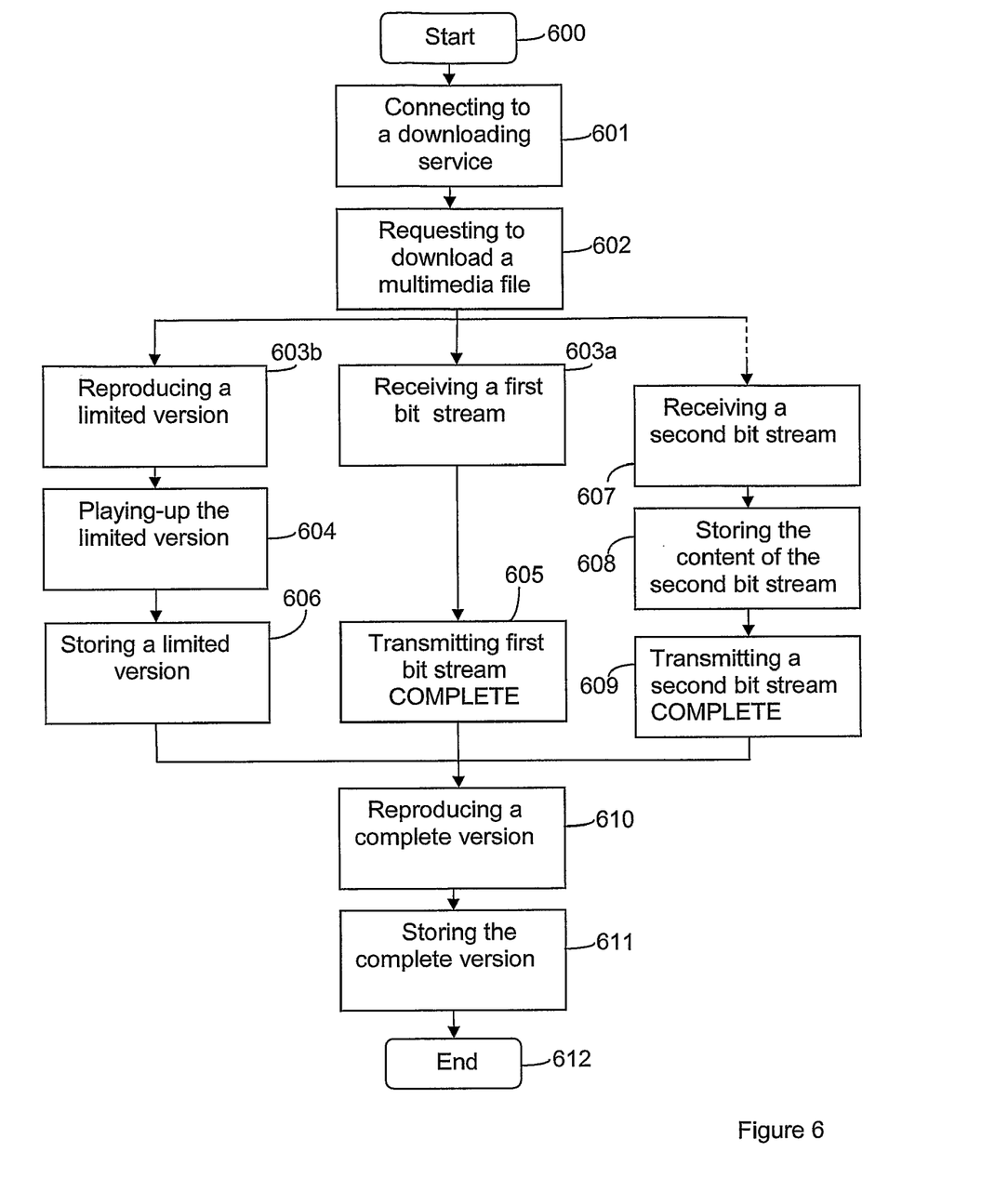
FIG. 6 is a flow chart, illustrating a procedure in the user device described with reference to FIG. 4 for downloading a multimedia file according to the first embodiment.

A procedure for retrieving and reproducing a downloaded multimedia file in a user device according to the first embodiment, will now be described with reference to FIG. 6.

This procedure, starting with step 600, is preferably realized as an optional service, wherein a user have the option to download a multimedia file in a conventional way, via a one bit stream, or by using the proposed, inventive method, using two bit streams and a bit stream combination.

In step 601, a user interacting with the user interface of a user device chooses to connect to a server, offering downloading via two bit streams and a bit stream combination. When connected to the downloading service, the user can search among available multimedia files, and, when a multimedia file to be downloaded is found, a user interaction may result in the transmission of a request for downloading the selected multimedia file to the server in step 602.

In a next step 603*a*, a first bit stream, comprising a first part of the selected multimedia file is received by a receiving means of the user device. The first bit stream is streamed to the user device, and, thus, during reception, the content of the first part is forwarded to a reproducing means. This is illustrated with step 603*b*, where the first part is successively decoded as the stream is received, resulting in a limited version of the selected multimedia file.

The decoded content of the first part is streamed to a multimedia player in step 604, where the limited version of the selected multimedia file is played-up in real-time. A successful reception of the first part is verified to the server with e.g. a "first bit stream COMPLETE" message in step 605. The limited version is then stored in a storing means in another step 606.

The second part of the selected multimedia file is received via a second bit stream in step 607, and the content of the second bit stream is stored in the storing means in a next step 608. When the second bit stream has been successfully received, this is indicated to the server with e.g. a "second bit stream COMPLETE" message, sent in step 609.

In a next step 610, both parts of the selected multimedia file are now retrieved from the storing means and forwarded to the reproducing means, where the second part is decoded, after which the decoded first part is combined with the decoded second part. A resulting complete version of the selected multimedia file is stored in the storing means in step 611, and the downloading procedure is terminated with step 612. The downloaded multimedia file, now being reproduced and stored as a limited version and a complete version in the user device, may be retrievable for further re-playing by the user.

Figure 7:
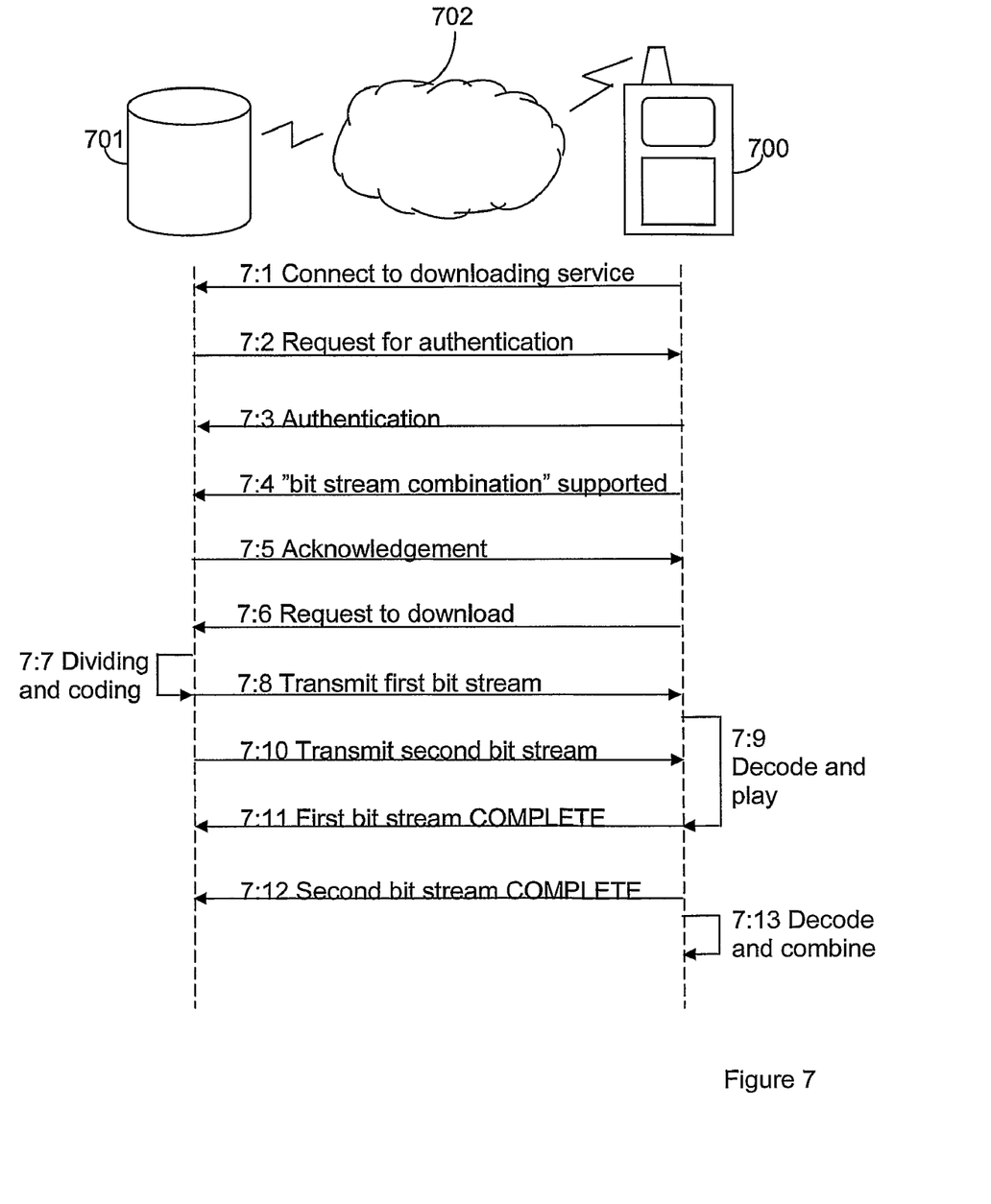
FIG. 7 is a signalling scheme, illustrating signalling between a server and a user device, participating in a downloading procedure of a multimedia file according to one embodiment.

The downloading procedure between a server and a user device will now be described as a signalling diagram with reference to the signalling scheme of FIG. 7.

In a first step 7:1, a user is connecting a fixed or a wireless user device 700 to a server 701, adapted to download multimedia files, via at least one fixed or wireless network 702.

In a next step 7:2, the server requests for authentication of the user, e.g. to authorize the user as a subscriber of a requested downloading service. The authentication procedure, illustrated with step 7:3, may be executed according with conventional authentication procedures, which will not be discussed any further in this document. In a next step 7:4, a "bit stream combination supported" message is sent from the user device, indicating to the server that the user device supports the claimed bit stream combination method, i.e. downloading of a multimedia file via two separate bit streams.

The server responds by sending an "acknowledgement" message to the user device in step 7:5. The user, now having access to a downloading service, providing bit stream combination, will be able to search for a multimedia file, e.g. a music tune, for downloading to the user device.

In step 7:6, a request for downloading of a selected multimedia file, is sent to the server. In response to the request, another step 7:7 initiates a dividing of the selected multimedia file into a first low-quality part, and a second high-quality, each of which are coded according to the requirements set for the respective part. At this stage also conditions, for transmission of the first and the second part are set in the server. In a next step 7:8, which may start immediately upon the termination of step 7:7, the first part is transmitted to the user device in a first bit stream. In step 7:9 the first bit stream is decoded and the low-quality content of the stream is re-played in real-time by the multimedia client in the user device.

Upon meeting the set of conditions for transmission of the second part, this part is sent to the user device in another step 7:10. It is to be noted that the transmission of the second part can be made at the same time, or later than the transmission of the first part, i.e. step 7:10 may coincide with, or occur later than step 7:8. In step 7:11, a "first bit stream COMPLETE" message is indicating to the server that the first low-quality part of the selected multimedia file has been successfully downloaded to the user device. In step 7:12 a corresponding "second bit stream COMPLETE" message indicates to the server that the second high-quality part has been successfully downloaded. Once both parts, associated with the selected multimedia file have been downloaded in the user device, also the second part is decoded and both parts are combined in another step 7:13, in order to yield the original, multimedia file.

While the invention has been described with reference to specific exemplary embodiments, the description is generally only intended to illustrate the inventive concept and should not be taken as limiting the scope of the invention, which is defined by the appended claims.

The invention claimed is:

1. A method of downloading a multimedia file from a server to a user device, at least partly using a bandwidth limited connection, comprising the following steps:
   connecting to said user device upon receiving a request for said downloading service from said user device,
   receiving a request to download a multimedia file via two bit streams from said user device,
   adapting said multimedia file for downloading via two bit streams, dividing said multimedia file into a first part, which is coded using a first coding, and into a second part, which is coded using a second coding, other that the first coding, wherein said first part is coded on the basis of the throughput requirements for streaming said first bit stream,
   storing said first part and said second part,
   setting up a first set of conditions for streaming said first part via a first bit stream, and a second set of conditions for downloading said second part via a second bit stream,
   streaming said first part to said user device when said first set of conditions is fulfilled,
   downloading said second part to said user device when said second set of conditions is fulfilled.

2. The method according to claim 1, wherein the throughput requirements for said streaming are the same as the coding of said first part of said multimedia file.

3. The method according to claim 1, wherein said first set of conditions is set so that said first part is streamed via a first access technology, and that said second set of conditions is set so that said second part is downloaded via a second access technology, different from the first access technology.

4. The method according to claim 3, wherein said first access technology is GSM/EDGE.

5. The method according to Previously Presented claim 3, wherein said second access technology is any of WLAN, WCDMA, LTE, WiMAX, CDMA, DSL or ADSL.

6. The method according to claim 3, wherein said first and second set of conditions are set so that said first part and said second part are downloaded via the same access technology.

7. A method of reproducing the content of a multimedia file, downloaded from a server to a user device, at least partly using a bandwidth limited connection, comprising the following steps:
   connecting said user device to a downloading service, provided by said server,
   requesting for downloading of a multimedia file via two separate bit streams, when said multimedia file has been selected through user interaction,
   receiving a first bit stream, comprising a first part of said multimedia file for reproducing a limited version of said multimedia file, wherein said limited version is adapted to be played-up in real-time by a multimedia player of said user device,
   receiving a second bit stream, comprising a second part of said multimedia file,
   storing said limited version and said second part in a storing means,
   reproducing said limited version in real-time by decoding said first part, using a first decoding, and a complete version of said multimedia file by decoding said second part, using a second decoding, other than the first decoding, and combining said first, decoded part with said second, decoded part, and,
   storing said limited version and said complete version in said storing means.

8. The method according to claim 1, wherein at said first part comprises a low-quality part, and said second part comprises a high-quality part of said multimedia file.

9. The method according to claim 7, wherein said method comprises a further step, wherein a stored version is played-up by a multimedia player upon receiving such a request through user interaction.

10. A user device adapted to reproduce the content of a multimedia file, downloaded from a server, at least partly using a bandwidth limited connection, the user device comprising:
    a processor adapted to:
    request for a connection set-up with said server, upon receiving a request for said downloading service, activated through user interaction via a user interface of said user device,
    transmit a first request for said downloading service to said server, and transmit a second request for downloading said multimedia file, when a multimedia file has been selected through user interaction via said user interface,
    receive said first bit stream and said second bit stream, carrying the content of said multimedia file, in response to said second request,
    decode said first multimedia file using a first decoding and reproduce a limited version of said multimedia file, from said first part, and decode said second multimedia file, using a second decoding, other than the first decoding and reproduce a complete version of said multimedia file by combining said first part with said second part, store a first limited version of said multimedia file, received in said first bit stream, a second part, received in said second bit stream, and a complete version, retrieved from said combining, and play-up a version of said selected multimedia file.

11. The user device according to claim 10, wherein said processor is further adapted to reproduce said first part and to forward said reproduced part to a multimedia player for playing up said limited version in real-time.

12. The user device according to claim 11 wherein said processor is further adapted to reproduce said limited version when said user device receives said first bit stream, and to reproduce said complete version when said user device has received said second bit stream.

13. The user device according to claim 10, wherein said processor is further adapted to indicate a successful receipt of each of the respective part of said downloaded multimedia file by initiating a transmission to said server of a COMPLETE message for each part.

14. A server, capable of downloading a multimedia file to a user device, at least partly using a bandwidth limited connection, the server comprising:

a processor adapted to:
set-up a downloading service connection with a user device upon receiving a first request, and to initiate a downloading via two bit streams upon receiving a second request from said user device to download a multimedia file, receive said first request, and said second request, divide said multimedia file into a first part and a second part, for coding said first part, using a first coding, and for coding said second part, using a second coding, other than the first coding, wherein said processor is adapted to code said first part on the basis of throughput requirements for streaming said first part of said selected media file, store said first part and said second part, stream a first bit stream, comprising the content of said first part when a first set of conditions, set by said processor, is fulfilled, and for downloading a second bit stream, comprising the content of said second part when a second set of conditions, set by said processor, is fulfilled.

15. The server according to claim 14, wherein said processor is further adapted to code said first part and said second part on the basis of different requirements.

16. The server according to claim 14, wherein said processor is further adapted to divide and code said selected multimedia file into a first low-quality part, comprising content necessary for reproducing a limited version of said selected multimedia file, and into a second high-quality part, comprising content, necessary for reproducing the original, multimedia file by combining the content of said first part and said second part.

17. The server according to claim 14, wherein said processor is further adapted to set-up said condition sets so that said two parts are transmitted via the same access technology.

18. The server according to claim 14, wherein said processor is further adapted to set-up said condition sets so that said two parts are transmitted via different access technologies.

19. The server according to claim 14, wherein said processor is further adapted to receive a COMPLETE message, verifying a successful reception of a part of said selected multimedia file from said user device when said part has been successfully received by said user device.

20. The server according to claim 19, wherein said processor is further adapted to terminate said downloading upon receiving a COMPLETE message indicating that said second part has been successfully received by said user device.

\* \* \* \* \*